April 16, 1968 R. C. MENTINK ET AL 3,378,684
FLUID SAMPLE CELL WITH MEANS TO KEEP CONSTANT
PRESSURE ON THE SAMPLE FLUID
Filed June 16, 1965

INVENTOR.
RAYMOND C. MENTINK
LEROY F. SHADD
BY
Ralph D. Hohenfeldt
ATTORNEY

# United States Patent Office 3,378,684
Patented Apr. 16, 1968

3,378,684
FLUID SAMPLE CELL WITH MEANS TO KEEP CONSTANT PRESSURE ON THE SAMPLE FLUID
Raymond C. Mentink, Greendale, and Le Roy F. Shadd, Hales Corners, Wis., assignors to General Electric Company, a corporation of New York
Filed June 16, 1965, Ser. No. 464,424
7 Claims. (Cl. 250—51.5)

ABSTRACT OF THE DISCLOSURE

A sample cell for radiation emission analysis in a vacuum comprises a cup and a coaxially interfitting cylinder. A thin diaphragm serves as the bottom of the cylinder and separates the latter from the cup. The cylinder may be filled with fluid to be analyzed and covered with a pliable radiation transparent film. The film is secured to the cylinder with a cap having a window across which there are a few grid bars. Before assembly, the cup is partially filled with a fluid of a certain vapor pressure. When the cell is in a vacuum, the vapor pressure acts through the diaphragm to keep constant pressure on the sample fluid.

---

This invention relates to a cell for holding a liquid, viscous, or powdered sample during analysis or treatment with radiation. The new cell is especially useful for analyzing a sample for its elemental constituents by X-ray emission phenomena in a vacuum spectrometer.

In X-ray emission analysis, primary radiation from an X-ray tube is projected onto a sample. If the radiation is sufficiently energetic, the chemical elements of the sample are excited to emit their characteristic radiations. The radiation from each element has an essentially unique photon energy and the intensity of each is related to the quantity of that element. The emitted X-ray photons may be detected or counted with a suitable device such as a proportional counter and the number of counts obtained per unit time may be compared with the counts from a sample of known composition. By this means, the quantities of the elements in the unknown sample may be determined.

Samples that are being analyzed for low atomic number elements are preferably excited with comparatively low energy primary radiation. These elements emit correspondingly low energy characteristic radiation. Hence, both the primary and the characteristic radiation are strongly attenuated or absorbed in any air that may exist between the X-ray source and the sample and between the sample and the detector. To minimize absorption, it is preferable to analyze samples for low atomic number elements, or for small quantities of any element, in an evacuated spectrometer.

Certain fluid samples that are stable under standard conditions of pressure and temperature undergo undesirable changes when they are placed in a vacuum. Gases that are dissolved in the fluid may be liberated from solution at low pressures and produce bubbles in the sample. Some samples, particularly liquids and jells, with high vapor pressures, may not only bubble, but they may boil and evaporate completely from the sample holder.

Previous attempts to overcome these problems have involved holding fluid samples in sealed cells which have an X-ray permeable window. However, when the window is made thin enough to transmit low energy X-ray photons efficiently, it tends to bulge outwardly when in a vacuum regardless of whether the window is at the bottom or the top of the cell. This results in reduced pressure inside the cell, causing gases to go out of solution or the fluid sample to vaporize. In some sample cells that are used with their window on top, bubbles may migrate to immediately underneath the window on the sample surface. Several undesirable results accompany these phenomena. One is that the amount of window bulge is unpredictable so that the distance between the X-ray source and sample and the sample and the detector may be different for different analyses. This may produce an error in the photon count, and hence, an error in the quantitative analysis. Another is that the presence of different sizes and quantities of bubbles in various samples means that a different amount of sample surface may be presented at a specific distance from the sample to the X-ray source and the detector in which case inconsistent and nonreproducible analyses are obtained.

A primary object of the present invention is to overcome the above noted and other problems by providing a sample cell that maintains proper pressure on a fluid sample during analysis in a vacuum, to thereby prevent both vaporization of the sample and liberation of gases that might form bubbles.

Some additional objects of this invention are to provide a sample cell: that may be used for liquid, jell, or powdered samples; that is easy to prepare for use; that is easy to assemble, disassemble, and clean; that controls the window deformation and maintains consistent sample surface conditions; and, that may be used in upright, inverted, or intermediate positions in vacuum and atmospheric pressure without adverse effect on the sample.

Achievement of the foregoing and other objects will appear at various places in the more detailed description of the invention which follows.

The invention may be characterized generally as a sample cell that has two chambers which are separated by a pliable film or diaphragm. One chamber has an X-ray permeable window and may be filled with the sample to be analyzed. The other chamber is a pressure reservoir which may be partly filled with a relatively volatile liquid that generates comparatively high vapor pressure under operating conditions. When the cell is placed in a vacuum or low pressure ambient that may tend to cause window deformation and reduced pressure on the sample, the partial vapor pressure of the liquid and the partial pressure of any gas in the region of the liquid combine to exert a pressure on the diaphragm to maintain the sample at a relatively constant pressure. Several volatile liquids may be mixed in order to develop a specific pressure from their individual partial vapor pressures.

An illustrative embodiment of the invention will now be described in greater detail in reference to the drawing in which.

Figure 1:
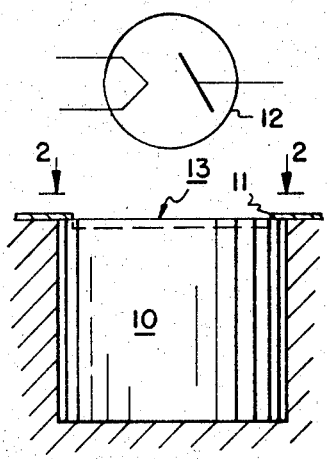
FIGURE 1 illustrates how the new sample cell may be used cooperatively with an X-ray tube in an X-ray emission spectrometer.

In FIGURE 1 the new sample cell is designated by the reference numeral 10. In a spectrometer, the top of cell 10 may be masked to provide a fixed area of X-ray exposure through an aperture 11. Primary radiation from an X-ray tube 12 may be projected downwardly toward the top of sample cell 10 in the general direction of arrow 13 and characteristic radiation may emanate from the sample in generally all directions above the plane of the sample surface. The analyzing crystal and X-ray detector which usually form part of the X-ray optical system in a spectrometer are omitted because they form no part of the instant invention and are well-known.

Figure 2:
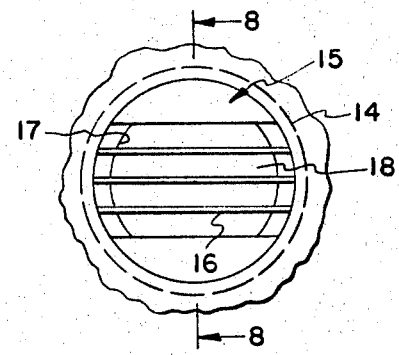
FIGURE 2 is a view of the sample cell taken in the direction of the arrows on a line corresponding approximately with 2—2 in FIGURE 1.

FIGURE 2 shows a top view of the new sample cell isolated from a spectrometer. It comprises a cylindrical housing 14 which is preferably made of aluminum or other light weight metal. The cylinder is closed at the top by a cap 15 in which openings are formed so as to produce three grid bars 16 which surmount an aperture 17. An X-ray permeable window 18 lies immediately underneath aperture 17 to thereby permit entry of primary radiation and exit of characteristic radiation from the sample cell.

It should be understood that the terms "top" and "bottom" as used herein in reference to the sample cell are merely adopted for convenience in describing the invention with respect to the drawings and are not intended to detract from the fact that the new sample cell may be used in any desired position.

The parts of the sample cell that are contained in housing 14 in FIGURE 2 are shown disassembled in FIGURES 3–6 in connection with which their construction and assembly will now be described.

Figure 3:
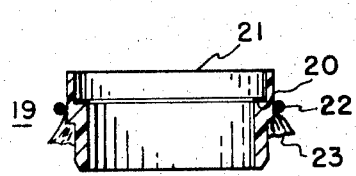
FIGURES 3–7 are cross-sectional, elevational views of several parts of the new cell in different stages of sample preparation and assembly; and, FIGURE 8 is a cross-sectional, elevational view, taken on the line 8—8 in FIGURE 2, of the new sample cell filled with a sample, assembled and ready for use in a spectrometer.

FIGURE 3 shows the sample chamber of the cell. It is seen to comprise a generally cylindrical part 19 which is preferably made of a corrosion-resistant material such as polypropylene. Sample chamber 19 is normally open at both ends and is provided with an internal shoulder on which a gasket 20 may be positioned. This gasket is preferably made of a material that has good solubility resistance to the sample materials that are expected to be used and in a commercial embodiment comprises a fabric impregnated with neoprene rubber. Obviously chamber 19 and the parts which are coupled to it could have a cross-section that is other than round so the term "cylindrical" is intended to be construed broadly to include such other shapes.

Chamber 19 is adapted to be closed at its top end with a thin film that constitutes a diaphragm 21. This film may be made of various materials and with various thicknesses, but in this example the film is .00025 inch thick and made of polyester resin such as that sold under the trademark Mylar. To install diaphragm 21, a portion of film is cut from a roll and deposited flatly on the top of chamber 19. A split metal ring 22, having an inside diameter that is slightly less than the outside diameter of chamber 19, is then pressed over the chamber so as to bring the film 21 down along its sides with the excess 23 extending below the ring so as to enable the film to be grasped with one's fingers. By partially surrounding chamber 19 about ring 22 with one hand and pulling downwardly on the end 23 of the film with the fingers of the other hand, the film or diaphragm 21 may be stretched tightly and without wrinkles over the top end of the chamber. Thus, it is seen that with diaphragm 21 held tightly in place by ring 22, the chamber 19 may be inverted to act as a cup for the sample to be analyzed.

Figure 4:
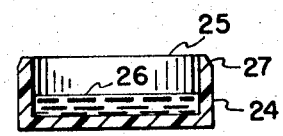

FIGURE 4 shows the lower chamber or pressure reservoir 24 which is also preferably made of polypropylene or other form and solubility stable material. Reservoir 24 has a closed bottom and an open top 25. The pressure that may be produced in this reservoir when the cell is assembled results from it being about one-third filled with a volatile liquid 26. The choice of this liquid depends on the nature of the sample to be analyzed to some extent, but it has been found that either ethyl or methyl alcohol has served the purpose in most cases. In any event, the partial vapor pressure caused by the liquid 26 and the partial pressure of any gas in reservoir should add to a pressure that exceeds the vapor pressure of the sample 28.

Figure 5:
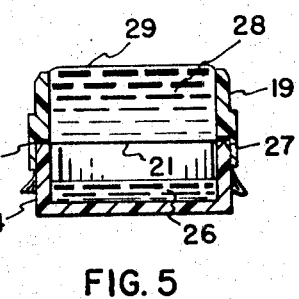

In FIGURE 5 the sample chamber 19 of FIGURE 3 has been inverted and pressed onto pressure reservoir 24 of FIGURE 4. When the assembly of FIGURE 5 is made, it may be seen that diaphragm 21 will be subjected to a shear force by the chamfered edges 27 of the reservoir which forces the diaphragm to seat tightly against gasket 20 in the now inverted chamber 19. Thus, the volatile liquid 26 is isolated by diaphragm 21 from the sample 28 containing region of the upper chamber 19. It should be apparent that when the pressure in the unfilled region above liquid 26 increases, that an upwardly directed force will be exerted on diaphragm 21. Upward deformation of diaphragm 21 will also result, of course, whenever there is a pressure differential between the partial pressures in reservoir 24 and the sample occupying space of chamber 19.

After parts 19 and 24 are pressed together as shown in FIGURE 5, the upper chamber 19 may be filled with fluid sample 28. It is desirable to put in enough sample 28 to cause a meniscus to form at its top surface 29. This assures that no voids will occur in the sample region.

It is easy to see that when the parts 19 and 24 are assembled as in FIGURE 5 that the press-fit which occurs will cause the film 21 to be seized tightly, in which case split ring 19 may be removed since it is no longer necessary. Ring 22 in a practical case, is made of a single turn of music wire.

Figure 6:
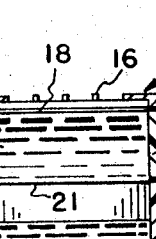

The cap assembly 15 for the sample cell is shown in FIGURE 6. It comprises an annular side wall 30 and is internally shouldered for receiving a gasket 31 which may be similar to gasket 20. A face of cap 15 has a plurality of elongated openings 17 which are subdivided by three parallel grid bars 16 in this example. A piece of X-ray permeable film 18 may be placed over the upper end of cap 15 as shown in FIGURE 6 and a split ring 32 may be deposited as shown in order to hold the film in place temporarily. The technique involved in installing X-ray permeable window 18 is the same as that employed in connection with installing diaphragm 21 as explained earlier reference to FIGURE 3. Window 18 may also be made of Mylar or other flexible, tough, imperforate X-ray permeable material.

It is desirable that cap 15 be made of metal in order to obtain grid bars that are of sufficient strength to withstand the pressure differential to which window 18 is subjected when the sample cell is in a vacuum ambient. In a commercial embodiment, the user is given the choice of employing caps 15 that are made of either substantially pure copper or substantially pure aluminum. Those versed in the art will appreciate that the choice of a cap depends on whether the metal out of which it is made is one of those elments whose quantity is being measured in the sample. The object in any case, is to avoid a cap which would emit radiation of a wave length that would interfere with the analysis. At this juncture, it is also worthy to note that grid bars 16 should be disposed in planes parallel with the incident beam from the X-ray tube and the reflected beam from the sample so the grids will have less shadowing effect on the surface of the sample.

Figure 7:
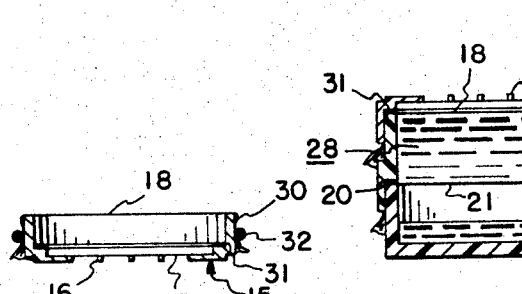

After the X-ray window film 18 is stretched over cap 15 as described in connection with FIGURE 6, the cap is inverted and slid lightly across the sample meniscus 29 to remove excess sample and to ensure complete wetting of the Mylar by the sample and is then pressed downwardly onto sample chamber 19 as shown in FIGURE 7. Ring 32 is then removed since window film 18 is now held securely in place by pressure exerted in the region of gasket 31.

Figure 8:
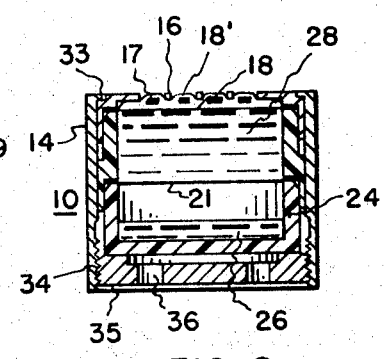

In FIGURE 8 the sample cell assembly of FIGURE 7 has been inserted in metal cylindrical housing 14 so that it abuts against a shoulder 33 at the upper end of the housing. At its lower end, housing 14 has an internal thread 34 into which may be screwed an externally threaded plug 35 which when tightened secures the cell assembly in a reproducible position. The plug may be provided with a pair of holes 36 which may be engaged by a spanner wrench or other two-pronged device, not shown, to facilitate turning the plug tightly in place.

When the assembly shown in FIGURE 8 is filled with sample material, it will be seen that X-ray permeable window 18 will be flat and undeformed if the sample cell is in the atmosphere. If the ambient pressure is reduced, however, the tendency will be for the window to bulge outwardly and assume the undulatory configuration that is identified by the reference numeral 18′. It may be seen that grid bars 16 limit the amount of outward deformation of the window material and cause its outer surface to be essentially planar with the top of the grid bars. This is important because if the window protrudes more or less between different analyses, the concomitant effect will be for the sample material to be at different distances from the X-ray source and detector. This would militate against obtaining reproducible results. In any design, the deformation characteristics of the window material, the depth of grid bars 16, and the space 17 between them should be preferably correlated so that the window material 18′ will assume a position that is substantially coplanar with the top of the grid bars when chamber 19 is filled with any sample and is inverted or upright as depicted in FIGURE 8.

It should also be observed that when sample holder 10 is in a vacuum ambient, as it would be in a vacuum spectrometer such as in FIGURE 1, that pressure on fluid sample 28 would be relieved, in which case bubbles would tend to form and migrate to a position immediately under window 18′. In accordance with the invention, this is precluded by the partial pressure of any gas and the partial vapor pressure of volatile liquid 26 changing for all conditions of pressure and temperature. Thus, there is a compensating force exerted on diaphragm 21 which holds sample 28 at a pressure that is sufficient to prevent the sample from degassing.

Some sample materials 28, particularly those with low vapor pressures, are not inclined to degas or expand volumetrically when they are in a vacuum or subjected to temperatures that are somewhat above room temperature. In these cases, one many omit the volatile liquid 26, if desired, while yet taking advantage of the other desirable features of the sample cell. It should also be recognized that the pressure exerted on diaphragm 21 from the pressure reservoir 24 remains the same for the same conditions regardless of whether the sample cell is upright, inverted, or at some intermediate angular position.

In summary, a sample cell has been described that prevents a fluid sample from degassing when it is placed in a vacuum, that maintains consistent sample surface conditions for precision X-ray emission analysis, that can be used in spectrometers having inverted or standard X-ray optical systems, that permits controlled pressure on the sample by use of a volatile fluid in a pressure reservoir, and that is easy to use with samples of liquid, jell, or powder consistency.

Although one form of the invention has been described in detail, it should be appreciated that such description is intended to be illustrative rather than limiting, for the invention may be variously embodied and is to be limited only by construing the claims which follow.

It is claimed:
1. A sample cell comprising:
 (a) a sample chamber having first and second openings and a thin radiation permeable window that has a tendency to deform and increase the volume of the chamber adapted to cover the first opening,
 (b) a pressure reservoir that has an opening and is adapted to be connected by interfitting with the sample chamber in a manner that substantially aligns the opening in the reservoir with the second opening in the sample chamber,
 (c) a flexible diaphragm that is seized by the connection between said chamber and reservoir, said diaphragm being disposed mutually across the opening of the reesrvoir and the second opening in the chamber,
 (d) said reservoir being adapted to include a fluid which develops vapor pressure that may urge the diaphragm toward the sample chamber to compensate pressure and volume changes that would result from deformation of the window when the chamber is filled with a sample.
2. The invention set forth in claim 1 including:
 (a) a grid means attachable to the sample chamber and having spaced grid bars that are parallel with said window and of such thickness as to maintain the outside of the window substantially coplanar with the outside of the bars when the window is deformed.
3. A sample cell comprising:
 (a) a sample chamber having normally open ends,
 (b) a flexible diaphragm disposed across one end of the chamber,
 (c) a pressure reservoir normally having an opening which is closed by the diaphragm when the chamber and reservoir are coupled together with their openings in substantial alignment,
 (d) a flexible radiation permeable window disposed across the other end of the chamber to create a volume for a sample that is bounded by the chamber, the window and the diaphragm,
 (e) a cap means engageable with the chamber at its said other end to secure the window over the normally open end and having an aperture for permitting radiation to enter and exit the window,
 (f) said cap means having an integral grid means that is located over the aperture,
 (g) the grid means comprising bars extending in substantial parallelism in one direction and being adapted to limit and define the deformed configuration of the window.
4. A sample cell comprising:
 (a) a cylindrical sample chamber having an opening and an internal shoulder means at one end and an opening at the other end,
 (b) a pressure reservoir that has an opening at one end and is adapted to interfit the sample chamber to thereby abut its shoulder,
 (c) a thin flexible diaphragm interposed between the chamber and reservoir for being secured across the openings thereof and sealed by the interfitting relationship of the chamber and reservoir,
 (d) a cap means having an aperture and a side wall defining an opening for receiving the other end of the sample chamber in interfitting relationship,
 (e) the said cap means having an internal shoulder that is abutted by the sample chamber,
 (f) a thin deformable radiation permeable window disposed over the said other end of the sample chamber for being sealed in the region of the shoulder in the cap to thereby prevent the sample from leaking from the chamber,
 (g) the said window being adapted to transmit radiation to and from the sample through said aperture.
5. The invention set forth in claim 4 wherein:
 (a) a gas and a fluid having a higher vapor pressure than a sample in the chamber are contained in the pressure reservoir whereby to develop total pressure on the diaphragm which maintains the sample chamber under pressure regardless of the window being deformed when the cell is in a low pressure ambient.
6. The invention set forth in claim 4 wherein:
 (a) a plurality of substantially parallel grid bars bridge the aperture in the cap to thereby control deformation of the window in a reproducible manner.
7. A press-fit sample cell assembly comprising:
 (a) a plastic cylinder having first and second end openings and an internal gasket shoulder, (b) a plastic pressure reservoir having an open top and a bottom, (c) a flexible diaphragm material adapted to be stretched across the first opening in spaced relationship with the shoulder, (d) a means for temporarily frictionally engaging the diaphragm material whereby to allow the diaphragm to yield toward and seal against the shoulder when the open end of the reservoir is interfit with the chamber, (e) a cap means having an apertured face and a circular side wall defining an opening for admitting the second open end of the chamber and said cap means having an internal shoulder, (f) a thin deformable radiation permeable window adapted to be stretched across the last mentioned opening in spaced relation and substantial parallelism with the shoulder in the cap means, (g) means for temporarily frictionally engaging the window material whereby to allow the window material to yield toward and seal against the shoulder means when the second open end of the sample chamber is pressed to interfit the cap means, and (h) a plurality of grid bars disposed across the aperture in the cap to control deformation of the window when the sample cell is subjected to a reduced pressure ambient, and (i) a fluid that develops a predetermined vapor pressure in the pressure reservoir to assist in maintaining a total pressure on the sample chamber by way of the diaphragm, which total pressure exceeds the vapor pressure of the sample.

References Cited

UNITED STATES PATENTS

| | | | |
|---|---|---|---|
| 2,875,340 | 2/1959 | Liston | 250—43.5 |
| 3,218,459 | 11/1965 | Bens | 250—51.5 |

OTHER REFERENCES

Review of Scientific Instruments, vol. 36, No. 4, Rodriguez et al., April 1965, pp. 449 to 452.

RALPH G. NILSON, *Primary Examiner.*

A. L. BIRCH, *Assistant Examiner.*